(12) United States Patent
Otsuki et al.

(10) Patent No.: US 11,639,002 B2
(45) Date of Patent: May 2, 2023

(54) CONTROL SYSTEM, CONTROL METHOD, AND PROGRAM

(71) Applicant: Toyota Jidosha Kabushiki Kaisha, Toyota (JP)

(72) Inventors: Nobuhisa Otsuki, Toyota (JP); Susumu Shimizu, Mitaka (JP); Hiroshi Bito, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 81 days.

(21) Appl. No.: 17/209,436

(22) Filed: Mar. 23, 2021

(65) Prior Publication Data

US 2021/0299883 A1 Sep. 30, 2021

(30) Foreign Application Priority Data

Mar. 30, 2020 (JP) .............................. JP2020-060324

(51) Int. Cl.
 *B25J 13/00* (2006.01)
 *B25J 9/16* (2006.01)
 *B25J 13/08* (2006.01)

(52) U.S. Cl.
 CPC ............. *B25J 13/006* (2013.01); *B25J 9/163* (2013.01); *B25J 9/1664* (2013.01); *B25J 9/1697* (2013.01); *B25J 13/088* (2013.01)

(58) Field of Classification Search
 CPC ........ B25J 13/006; B25J 9/163; B25J 9/1664; B25J 9/1697; B25J 13/088; G05D 2201/02; G05D 1/0022; H04W 36/0055; H04W 36/08; H04W 36/165; H04W 36/30

USPC ................. 700/245–264; 318/568.11–568.25
See application file for complete search history.

(56) References Cited

U.S. PATENT DOCUMENTS

| | | | | |
|---|---|---|---|---|
| 4,451,916 A | * | 5/1984 | Casper ............. | H04B 10/25891 398/5 |
| 5,548,296 A | * | 8/1996 | Matsuno ............... | H04W 64/00 342/418 |
| 5,596,439 A | * | 1/1997 | Dankberg ................ | H04B 1/12 455/295 |
| 5,612,948 A | * | 3/1997 | Fette .................... | H04B 7/2646 370/468 |

(Continued)

FOREIGN PATENT DOCUMENTS

| EP | 1126636 A2 | 8/2001 |
|---|---|---|
| JP | 2001230715 A | 8/2001 |

(Continued)

*Primary Examiner* — Jaime Figueroa
(74) *Attorney, Agent, or Firm* — Dinsmore & Shohl LLP

(57) ABSTRACT

The control system is a control system that controls a connection between an autonomous mobile robot and a base station, the control system including: a radio communication unit that communicates with the base station; and a connection control unit that performs control, in a connection of communication performed by the radio communication unit, when a radio wave shielding object which the autonomous mobile robot is able to pass through is on a path along which the autonomous mobile robot is to move, so that the autonomous mobile robot is prompted to connect to a predetermined base station of which a received radio wave intensity at a position on the path in front of the shielding object is affected by the shielding object.

9 Claims, 13 Drawing Sheets

(56) References Cited

U.S. PATENT DOCUMENTS

| | | | | |
|---|---|---|---|---|
| 5,890,055 A * | 3/1999 | Chu | ...................... | H04B 7/2606 |
| | | | | 455/21 |
| 6,735,630 B1 * | 5/2004 | Gelvin | ................... | G08B 25/10 |
| | | | | 709/200 |
| 7,136,645 B2 * | 11/2006 | Hanson | ................. | H04L 67/133 |
| | | | | 709/225 |
| 7,323,991 B1 * | 1/2008 | Eckert | ...................... | G07C 9/28 |
| | | | | 235/382 |
| 7,574,208 B2 * | 8/2009 | Hanson | ................. | H04L 63/102 |
| | | | | 709/225 |
| 8,180,486 B2 * | 5/2012 | Saito | ...................... | G06N 3/008 |
| | | | | 701/461 |
| 9,216,508 B2 * | 12/2015 | Ruuspakka | ........... | G05D 1/0285 |
| 9,623,562 B1 * | 4/2017 | Watts | ................... | H04B 17/318 |
| 9,668,146 B2 * | 5/2017 | Lau | ........................ | H04W 24/10 |
| 10,989,542 B2 * | 4/2021 | Zhang | ........................ | G01S 5/16 |
| 11,438,830 B2 * | 9/2022 | Shimizu | ................ | H04W 48/20 |
| 2001/0014586 A1 * | 8/2001 | Nakatsugawa | ........ | H04B 7/155 |
| | | | | 455/13.1 |
| 2002/0098840 A1 * | 7/2002 | Hanson | ................... | H04W 4/02 |
| | | | | 455/435.3 |
| 2007/0038759 A1 * | 2/2007 | Hanson | ................... | H04L 1/1887 |
| | | | | 709/227 |
| 2008/0001735 A1 * | 1/2008 | Tran | ...................... | A61B 5/0077 |
| | | | | 340/539.22 |
| 2008/0086236 A1 * | 4/2008 | Saito | .................... | G05D 1/0251 |
| | | | | 901/1 |
| 2011/0093443 A1 * | 4/2011 | Alizadeh-Shabdiz | | ....................... |
| | | | | H04W 64/00 |
| | | | | 707/705 |
| 2013/0297069 A1 * | 11/2013 | Tachiwa | .................... | B25J 9/16 |
| | | | | 700/245 |
| 2015/0156747 A1 * | 6/2015 | Skaaksrud | ....... | G06Q 10/08355 |
| | | | | 455/456.1 |
| 2015/0197010 A1 * | 7/2015 | Ruuspakka | ........... | B25J 9/1664 |
| | | | | 700/245 |
| 2016/0271794 A1 * | 9/2016 | Inaba | ..................... | B25J 9/1602 |
| 2016/0282863 A1 * | 9/2016 | Angle | .................. | H04L 12/282 |
| 2017/0239816 A1 * | 8/2017 | Loughran | ............. | G05D 1/0022 |
| 2019/0084161 A1 * | 3/2019 | Tokuhashi | ............. | B25J 9/0084 |
| 2020/0217666 A1 * | 7/2020 | Zhang | .................. | H04W 4/029 |
| 2020/0245217 A1 * | 7/2020 | Zhang | .................. | H04W 36/08 |
| 2021/0250847 A1 * | 8/2021 | Shimizu | ................ | H04W 48/16 |
| 2021/0293546 A1 * | 9/2021 | Zhang | ...................... | G06T 17/05 |
| 2021/0356279 A1 * | 11/2021 | Szigeti | ............... | G01C 21/3407 |

FOREIGN PATENT DOCUMENTS

| | | |
|---|---|---|
| JP | 2006-089262 A | 4/2006 |
| JP | 2008-90576 A | 4/2008 |
| JP | 2008090575 A | 4/2008 |
| JP | 2009200926 A | 9/2009 |
| JP | 2012-018646 A | 1/2012 |

* cited by examiner

| RULE NUMBER | POINT IMMEDIATELY BEFORE SHIELDING OBJECT | POINT IMMEDIATELY AFTER SHIELDING OBJECT | ACCESS POINT TO WHICH AUTONOMOUS MOBILE ROBOT IS TO BE PROMOTED TO CONNECT |
|---|---|---|---|
| 1 | $P_1$ | $P_1'$ | $AP_3$ |
| 2 | $P_1'$ | $P_1$ | $AP_1$ |
| 3 | $P_2$ | $P_2'$ | $AP_4$ |
| 4 | $P_2'$ | $P_2$ | $AP_5$ |
| 5 | $P_3$ | $P_3'$ | $AP_2$ |
| 6 | $P_3'$ | $P_3$ | $AP_6$ |
| ⋮ | ⋮ | ⋮ | ⋮ |

Fig. 6

| RULE NUMBER | POINT IMMEDIATELY BEFORE SHIELDING OBJECT | POINT IMMEDIATELY AFTER SHIELDING OBJECT | ACCESS POINT TO WHICH AUTONOMOUS MOBILE ROBOT IS TO BE PROMOTED TO CONNECT | PRESENCE OR ABSENCE OF SHIELDING OBJECT |
|---|---|---|---|---|
| 1 | $P_1$ | $P_1'$ | $AP_3$ | ABSENCE |
| 2 | $P_1'$ | $P_1$ | $AP_1$ | ABSENCE |
| 3 | $P_2$ | $P_2'$ | $AP_4$ | PRESENCE |
| 4 | $P_2'$ | $P_2$ | $AP_5$ | PRESENCE |
| 5 | $P_3$ | $P_3'$ | $AP_2$ | ABSENCE |
| 6 | $P_3'$ | $P_3$ | $AP_6$ | ABSENCE |
| ... | ... | ... | ... | ... |

Fig. 12

CONTROL SYSTEM, CONTROL METHOD, AND PROGRAM

CROSS REFERENCE TO RELATED APPLICATIONS

This application is based upon and claims the benefit of priority from Japanese patent application No. 2020-060324, filed on Mar. 30, 2020, the disclosure of which is incorporated herein in its entirety by reference.

BACKGROUND

The present disclosure relates to a control system, a control method, and a program, and in particular, to control of a radio connection of an autonomous mobile robot.

In recent years, an autonomous mobile robot that moves autonomously in a building or outdoors and conveys articles and the like has been developed. Such an autonomous mobile robot may perform radio communication with another device in order to execute processing. In this case, the autonomous mobile robot performs radio communication with the other device via, for example, a base station. Further, when there is a radio wave shielding object, such as a door, on a moving path, a received radio wave intensity in the robot is reduced due to the influence of the shielding object. However, when the robot moves along the moving path and passes through the shielding object, the robot is no longer affected by the shielding object and the received radio wave intensity is recovered.

It should be noted that an autonomous mobile robot moves and thus it is necessary to switch a base station to which it connects. In this regard, for example, Japanese Unexamined Patent Application Publication No. 2008-90576 discloses that a base station is selected by using a map indicating to which base station an autonomous mobile robot should be connected to achieve a good connection at various points in a moving area.

SUMMARY

In the above-described technique disclosed in Japanese Unexamined Patent Application Publication No. 2008-90576, when the radio wave intensity of the radio wave received from a base station is low, this base station is not selected. Therefore, in a case where there is a radio wave shielding object on the moving path, even if it is appropriate that the autonomous mobile robot is to connect to this base station, the autonomous mobile robot cannot connect to it.

The present disclosure has been made in view of the aforementioned circumstances and an object thereof is to provide a control system, a control method, and a program that are capable of selecting, even when there is a radio wave shielding object on a moving path of a robot, a base station of which radio waves are interfered with by the shielding object as a connection destination.

A first exemplary aspect to achieve the aforementioned object is a control system configured to control a connection between an autonomous mobile robot and a base station, the control system including: a radio communication unit configured to communicate with the base station; and a connection control unit configured to, in a connection of communication performed by the radio communication unit, perform control, when a radio wave shielding object which the autonomous mobile robot is able to pass through is on a path along which the autonomous mobile robot is to move, so that the autonomous mobile robot is prompted to connect to a predetermined base station of which a received radio wave intensity at a position on the path in front of the shielding object is affected by the shielding object.

According to the above control system, when there is a shielding object, the autonomous mobile robot is prompted to connect to a predetermined base station of which the received radio wave intensity is affected by the shielding object. Therefore, even when there is a shielding object, it is possible to select a base station of which radio waves are interfered with by the shielding object as a connection destination.

In the above exemplary aspect, the connection control unit may perform control so that the autonomous mobile robot connects to the predetermined base station.

By doing so, the autonomous mobile robot preferentially connects to the predetermined base station. Therefore, even when there is a shielding object, it is possible to reliably select the predetermined base station as a connection destination.

In the above exemplary aspect, the connection control unit may compare a value obtained by correcting and increasing a value of a received radio wave intensity of a radio wave from the predetermined base station with a value of a received radio wave intensity of a radio wave from another base station and thereby determine a base station to be a connection destination.

In this way, in regard to the predetermined base station, the increased received radio wave intensity is used for the above comparison. Thus, it is possible to prevent occurrence of a case in which the predetermined base station is not selected due to a decrease in the received radio wave intensity caused by the influence of the shielding object. Therefore, it is possible to select the base station of which radio waves are interfered with by the shielding object as a connection destination.

In the above exemplary aspect, the control system may further include a shielding object information acquisition unit configured to acquire position information of the shielding object detected by the autonomous mobile robot, and the connection control unit may specify, based on a position of the shielding object indicated by the position information that is acquired by the shielding object information acquisition unit and a predetermined rule indicating a base station to which the autonomous mobile robot should be prompted to connect when the shielding object is at the position, the predetermined base station to which the autonomous mobile robot is to be prompted to connect.

According to the above control system, the predetermined base station which corresponds to the shielding object detected by the autonomous mobile robot and to which the autonomous mobile robot should be prompted to connect is specified. Therefore, even when a shielding object newly appears, it is possible to select the base station of which radio waves are interfered with by this shielding object as a connection destination.

In the above exemplary aspect, the control system may further include an image analysis unit configured to analyze the position of the shielding object based on an image of a camera configured to shoot the path, and the connection control unit may specify, based on the position obtained by the analysis performed by the image analysis unit and the predetermined rule indicating the base station to which the autonomous mobile robot should be prompted to connect when the shielding object is at the position, the predetermined base station to which the autonomous mobile robot is to be prompted to connect.

According to the above control system, the predetermined base station which corresponds to the shielding object shot by the camera and to which the autonomous mobile robot should be prompted to connect is specified. Therefore, even when a shielding object newly appears, it is possible to select the base station of which radio waves are interfered with by this shielding object as a connection destination.

In the above exemplary aspect, when a position of the autonomous mobile robot is the position on the path in front of the shielding object and a section in which the autonomous mobile robot moves from the position to the shielding object is a section in which no communication is performed, the connection control unit may perform control so that the autonomous mobile robot is prompted to connect to the predetermined base station.

By doing so, the autonomous mobile robot is prompted, in the section in which no communication is performed, to connect to the predetermined base station of which the received radio wave intensity is affected by the shielding object. Therefore, even when the autonomous mobile robot connects to the predetermined base station in a state where the received radio wave intensity of the radio wave from the predetermined base station is insufficient, it is possible to prevent failures due to a communication malfunction.

In the above exemplary aspect, the shielding object may be equipment including a door.

By doing the above, even when such equipment is located on the path, it is possible to select a base station of which radio waves are interfered with by this equipment as a connection destination.

In the above exemplary aspect, the shielding object may be an object that is temporarily located on the path.

By doing the above, even when such an object is located on the path, it is possible to select a base station of which radio waves are interfered with by this object as a connection destination.

Another exemplary aspect to achieve the aforementioned object is a control method for controlling a connection between an autonomous mobile robot and a base station, the control method including: determining whether a radio wave shielding object which the autonomous mobile robot is able to pass through is on a path along which the autonomous mobile robot is to move; and in a connection of communication performed by the radio communication unit configured to communicate with the base station, performing control, when the shielding object is on the path, so that the autonomous mobile robot is prompted to connect to a predetermined base station of which a received radio wave intensity at a position on the path in front of the shielding object is affected by the shielding object.

According to the above control method, when there is a shielding object, the autonomous mobile robot is prompted to connect to a predetermined base station of which the received radio wave intensity is affected by the shielding object. Therefore, even when there is a shielding object, it is possible to select the base station of which radio waves are interfered with by the shielding object as a connection destination.

Another exemplary aspect to achieve the aforementioned object is a program for controlling a connection between an autonomous mobile robot and a base station, the program causing a computer to execute: a determination step of determining whether a radio wave shielding object which the autonomous mobile robot is able to pass through is on a path along which the autonomous mobile robot is to move; and a control step of, in a connection of communication performed by the radio communication unit configured to communicate with the base station, performing control, when the shielding object is on the path, so that the autonomous mobile robot is prompted to connect to a predetermined base station of which a received radio wave intensity at a position on the path in front of the shielding object is affected by the shielding object.

According to the above program, when there is a shielding object, the autonomous mobile robot is prompted to connect to a predetermined base station of which the received radio wave intensity is affected by the shielding object. Therefore, even when there is a shielding object, it is possible to select the base station of which radio waves are interfered with by the shielding object as a connection destination.

According to the present disclosure, it is possible to provide a control system, a control method, and a program that are capable of selecting, even when there is a radio wave shielding object on a moving path of a robot, a base station of which radio waves are interfered with by the shielding object as a connection destination.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 6 is a table showing an example of a predetermined rule used for control performed by a connection control unit according to the first embodiment;

FIG. 12 is a table showing an example of a predetermined rule used for control performed by a connection control unit according to the second embodiment;

DETAILED DESCRIPTION

Hereinafter, embodiments will be described with reference to the drawings.

First Embodiment

Figure 1:
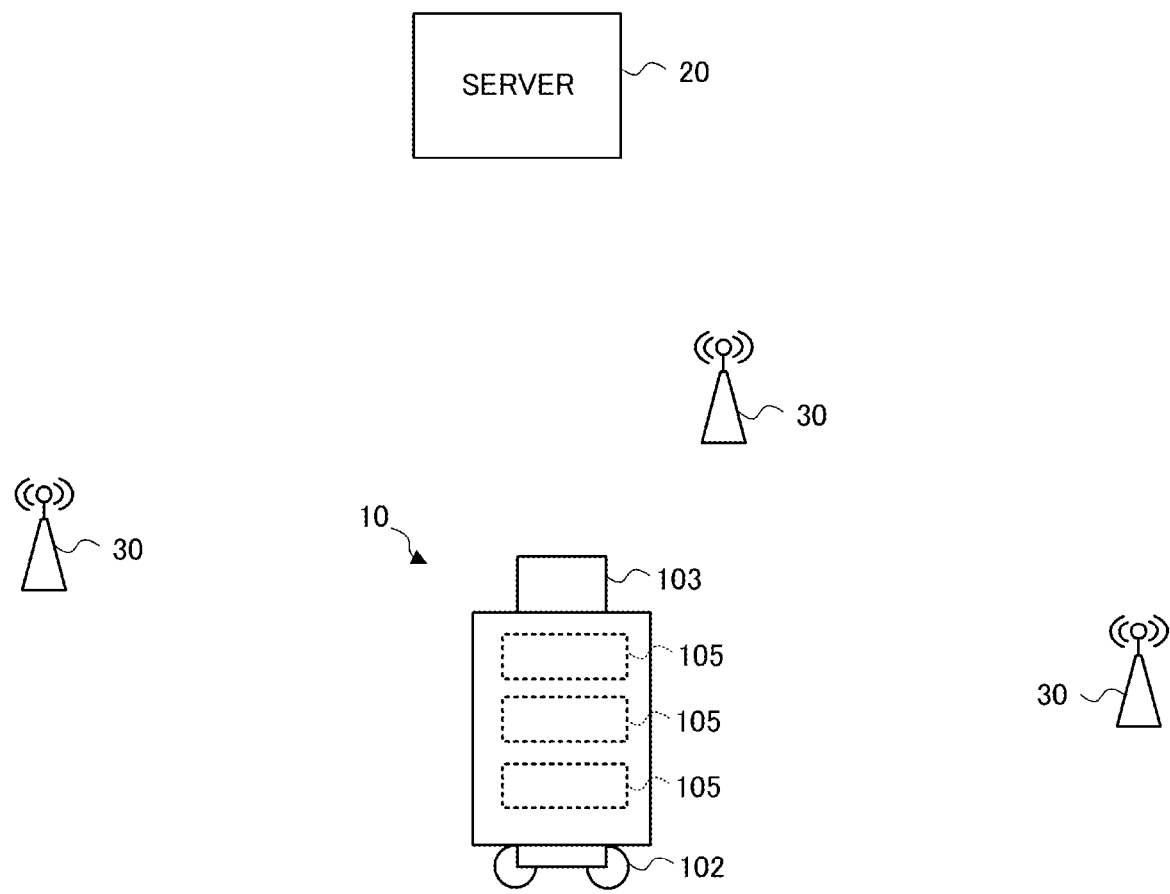
FIG. 1 is a schematic diagram showing an example of a system configuration of a task execution system according to a first embodiment.

FIG. 1 is a schematic diagram showing an example of a system configuration of a task execution system 1 according to an embodiment. The task execution system 1 includes an autonomous mobile robot 10, a server 20, and a base station 30. Note that among the components included in the task execution system 1, a component that performs processing related to a radio connection, which will be described later, may be referred to as a control system. That is, the task execution system 1 includes a control system that controls a connection between the autonomous mobile robot 10 and the base station 30.

A plurality of base stations 30 are provided in a moving environment of the autonomous mobile robot 10 and perform radio communication with the autonomous mobile robot 10. In this embodiment, the base station 30 is, for example, an access point of a wireless Local Area Network (LAN) such as WiFi (registered trademark), but may instead be a base station for radio communication of other radio communication standards.

The autonomous mobile robot 10 is a robot that sequentially executes a plurality of tasks including a movement. Here, the task means a unit of processing performed by the autonomous mobile robot 10 to achieve a predetermined purpose. The autonomous mobile robot 10 sequentially executes, for example, a task of moving from its current location to an elevator hall, a task of calling an elevator car, a task of waiting until the elevator car arrives, a task of getting on the elevator car, a task of getting off the elevator car, and a task of moving from the point where the autonomous mobile robot 10 gets off the elevator car to a point A. By doing so, the autonomous mobile robot 10 achieves the purpose of, for example, delivering an article received from a user to the point A. Note that the tasks described above are merely examples, and the autonomous mobile robot 10 may instead execute other tasks.

Some of the various tasks performed by the autonomous mobile robot 10 require communication with another device. For example, in order to call an elevator car, the autonomous mobile robot 10 communicates with the server 20. Specifically, the autonomous mobile robot 10 communicates with another device via radio communication with the base station 30. In this embodiment, the autonomous mobile robot 10 communicates with the server 20 via the base station 30. Therefore, the autonomous mobile robot 10 is connected to one of the plurality of base stations 30 so that it can communicate with the server 20.

Note that the autonomous mobile robot 10 includes, for example, storage spaces 105 for articles, and drives a moving device 102 to convey articles stored in the storage spaces 105 to a destination.

The server 20 is a device that provides a task to be executed by the autonomous mobile robot 10 to the autonomous mobile robot 10. Further, the server 20 controls equipment located in the moving environment of the autonomous mobile robot 10. More specifically, the server 20 controls equipment which the autonomous mobile robot 10 uses in order to execute a task. For example, the server 20 controls an elevator, an automatic door, and the like located in the moving environment.

The server 20 is connected to the base station 30 wirelessly or by wire so that they can communicate with each other. Further, the server 20 is connected to equipment such as an elevator located in the moving environment wirelessly or by wire so that they can communicate with each other.

Note that in this embodiment, the autonomous mobile robot 10 executes a task provided by the server 20, but the autonomous mobile robot 10 may not necessarily receive a task provided by the server 20. That is, the autonomous mobile robot 10 may determine a task to be executed from among predetermined tasks by itself.

Next, the autonomous mobile robot 10 is described in detail.

Figure 2:
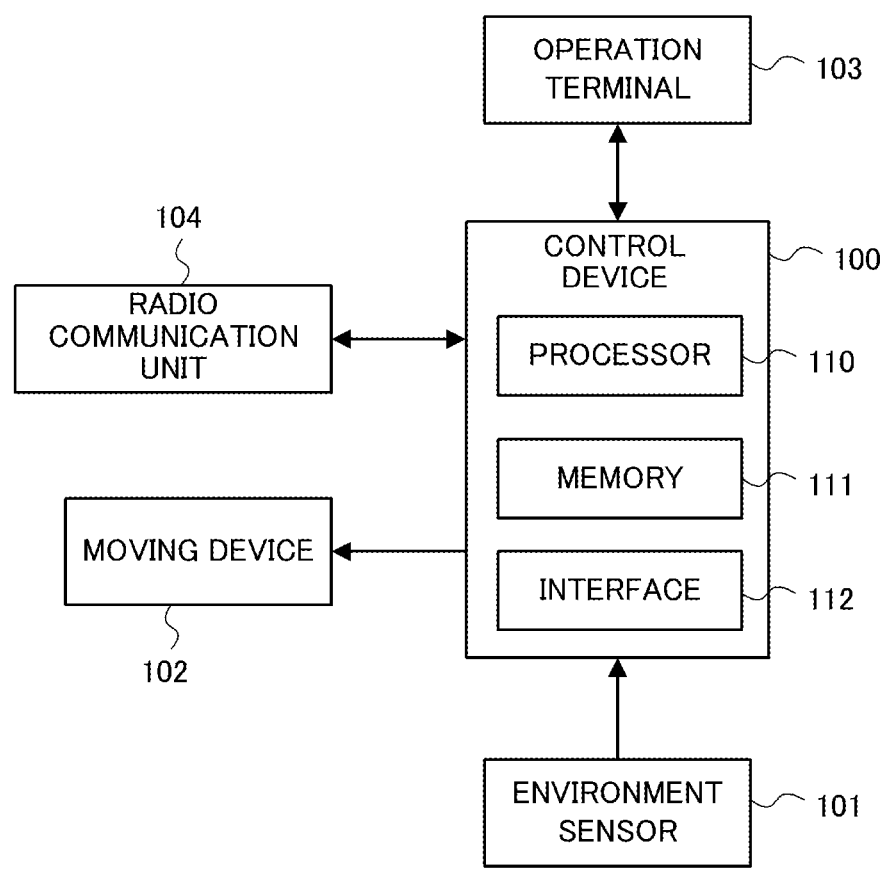
FIG. 2 is a block diagram showing an example of a hardware configuration of an autonomous mobile robot according to an embodiment.

FIG. 2 is a block diagram showing an example of a hardware configuration of the autonomous mobile robot 10. As shown in FIG. 2, the autonomous mobile robot 10 includes a control device 100, an environment sensor 101, the moving device 102, an operation terminal 103, and a radio communication unit 104.

The control device 100 is a device that controls the autonomous mobile robot 10, and includes a processor 110, a memory 111, and an interface 112. The processor 110, the memory 111 and the interface 112 are connected to one another via a data bus or the like.

The interface 112 is an input/output circuit used to communicate with another device such as the environment sensor 101, the moving device 102, the operation terminal 103, and the radio communication unit 104.

The memory 111 is composed of, for example, a combination of a volatile memory and a non-volatile memory. The memory 111 is used to store software (a computer program) including at least one instruction executed by the processor 110, data used for various kinds of processing performed by the autonomous mobile robot 10, and the like.

The processor 110 loads the software (the computer program) from the memory 111 and executes the loaded software, thereby performing processing of each component shown in FIG. 3 which will be described later. Specifically, the processor 110 performs processing of each of a task execution unit 120, a position estimation unit 130, a path planning unit 140, a movement control unit 150, and a connection control unit 160.

The processor 110 may be, for example, a microprocessor, a Micro Processor Unit (MPU), or a Central Processing Unit (CPU). The processor 110 may include a plurality of processors.

As described above, the control device 100 is a device that functions as a computer.

The environment sensor 101 is a sensor that detects environmental information (e.g., distance information and image information about surrounding objects) about the surroundings of the autonomous mobile robot 10. The environment sensor 101 may be, for example, a distance sensor such as a camera (RGB-D and stereo cameras), a laser range finder, or an ultrasonic sensor. The environment sensor 101 detects environmental information required for the autonomous mobile robot 10 to move. The environment sensor 101 outputs the detected environmental information to the control device 100.

The moving device 102 is a device that moves the autonomous mobile robot 10 to a desired position in response to a control signal from the control device 100, for example, by driving a motor and thereby rotating a plurality of wheels. Note that the moving device 102 does not have to be a wheel type moving device, and may instead be, for example, a walking type moving device.

The operation terminal 103 is a terminal that receives an operation input from a user and outputs information, and is, for example, a terminal including a touch panel. Note that the operation terminal 103 may be implemented not only by a touch panel but also by other input/output devices.

The radio communication unit 104 is a circuit that wirelessly connects to the base station 30 in order to communicate with another device such as the server 20, and includes, for example, a radio transmission/reception circuit and an antenna. The radio communication unit 104 establishes a radio connection with a base station selected under the control of the connection control unit 160, which will be described later, and communicates with this base station.

Figure 3:
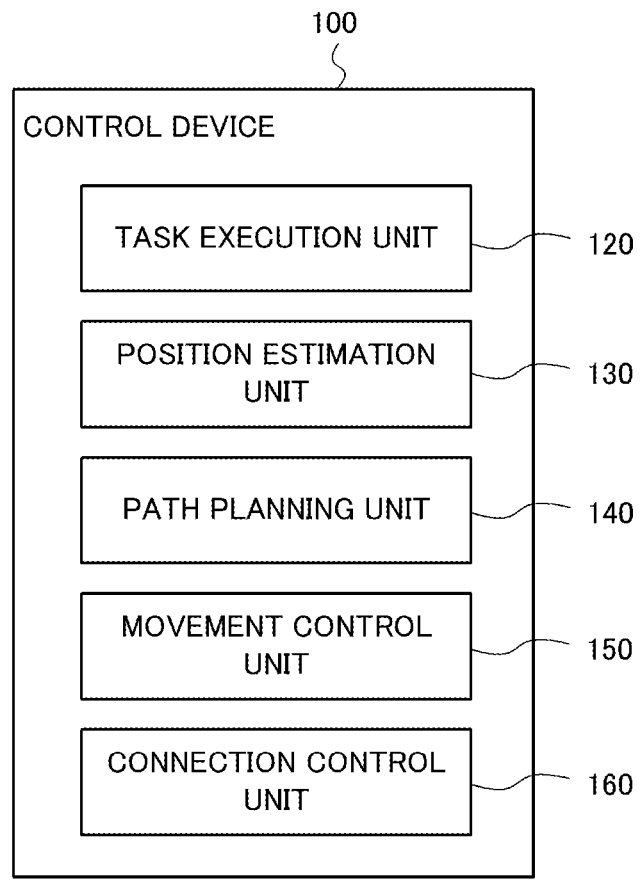
FIG. 3 is a block diagram showing an example of a functional configuration of a control device of an autonomous mobile robot according to the first embodiment.

FIG. 3 is a block diagram showing an example of a functional configuration of the control device 100 of the autonomous mobile robot 10. As shown in FIG. 3, the autonomous mobile robot 10 includes the task execution unit 120, the position estimation unit 130, the path planning unit 140, the movement control unit 150, and the connection control unit 160.

The task execution unit 120 sequentially executes a plurality of tasks in order to achieve a predetermined purpose. For example, the task execution unit 120 sequentially executes a series of tasks provided by the server 20.

For example, when a user instructs the autonomous mobile robot 10 to convey an article to the point A through the operation terminal 103, the task execution unit 120 sequentially executes a series of tasks for conveying the article from the current location of the autonomous mobile robot 10 to the point A. In this embodiment, these tasks are provided by the server 20. That is, when a user instructs the autonomous mobile robot 10 to convey an article to the point A, the task execution unit 120 transmits this instruction to the server 20. In response to this, the server 20 transmits, to the autonomous mobile robot 10, a series of tasks for conveying an article from the current location of the autonomous mobile robot 10 to the point A. In response to this, the task execution unit 120 sequentially executes the tasks received from the server 20. The task execution unit 120 sequentially executes, for example, a task of moving from the current location of the autonomous mobile robot 10 to an elevator hall, a task of calling an elevator car, a task of waiting until the elevator car arrives, a task of getting on the elevator car, a task of getting off the elevator car, and a task of moving from the point where the autonomous mobile robot 10 gets off the elevator car to the point A.

Note that specific examples of the tasks executed by the task execution unit 120 are not limited to the above-described contents. For example, the task execution unit 120 may execute a task of waiting at a predetermined place to pass another autonomous mobile robot 10 or the like in a path, a task of reporting on the progress of a task to the server 20 by notifying the server 20 of the completion of the execution of the task, or a task of passing through an automatic door. As described above, the task execution unit 120 can execute a task of any content.

In particular, when the task execution unit 120 executes a task of moving the autonomous mobile robot 10 by means of the moving device 102, the task execution unit 120 uses the position estimation unit 130, the path planning unit 140, and the movement control unit 150. By the processing of each of the position estimation unit 130, the path planning unit 140, and the movement control unit 150, the autonomous mobile robot 10 can autonomously move by means of the moving device 102. Therefore, the autonomous mobile robot 10 can execute a task of moving by means of the moving device 102 without communicating with another device. Note that the autonomous mobile robot 10 may communicate with another device in order to move.

The position estimation unit 130 refers to data of a map of the moving environment stored in the memory 111 or the like in advance and thereby estimates a self-position of the autonomous mobile robot 10, that is, a position of the autonomous mobile robot 10 itself on the map of the moving environment. In other words, the position estimation unit 130 estimates which position on the map the current position of the autonomous mobile robot 10 corresponds to. The position estimation unit 130 estimates the self-position of the autonomous mobile robot 10 using any known technique. For example, the position estimation unit 130 may estimate the self-position of the autonomous mobile robot 10 by comparing environmental information detected by the environment sensor 101 with the map of the moving environment, by dead reckoning using odometry information, by using a Global Navigation Satellite System (GNSS), or by combining any of the above.

The path planning unit 140 plans a moving path to a destination point based on the map of the moving environment and the self-position of the autonomous mobile robot 10 estimated by the position estimation unit 130. The path planning unit 140 plans a moving path of the autonomous mobile robot 10 in which an obstacle or the like is avoided based on the map of the moving environment and the self-position of the autonomous mobile robot 10 by using, for example, a well-known path search algorithm. In this way, for example, the path planning unit 140 plans a moving path from the current location of the autonomous mobile robot 10 to the elevator hall, a moving path from the point in which the autonomous mobile robot 10 gets off the elevator car to the point A, and the like.

The movement control unit 150 controls the movement of the autonomous mobile robot 10 in accordance with the moving path planned by the path planning unit 140. That is, the movement control unit 150 controls the moving device 102 so that the autonomous mobile robot 10 moves along the planned moving path. More specifically, the movement control unit 150 transmits a control signal to the moving device 102, to thereby control a moving direction and a moving speed of the autonomous mobile robot 10.

The connection control unit 160 controls a radio connection between the radio communication unit 104 and the base station 30. The connection control unit 160 searches for the base stations 30 and switches the base stations 30 so that it is a connection destination of communication performed by the radio communication unit 104. Specifically, for example, the connection control unit 160 may search for the base stations 30 by receiving Wi-Fi beacon signals from the base stations 30 (i.e., by performing a passive scan), or by sending probe requests and receiving responses thereto (i.e., by performing an active scan).

The connection control unit 160 selects the base station 30 to which the autonomous mobile robot 10 connects based on the received radio wave intensities of the signals from the found base stations 30. The connection control unit 160 generally selects the base station 30 having the maximum received radio wave intensity as the base station 30 to which the autonomous mobile robot 10 connects. However, in this embodiment, in a connection of communication performed by the radio communication unit 104, the connection control unit 160 performs control, when a radio wave shielding object is on a path along which the autonomous mobile robot 10 is to move, so that the autonomous mobile robot 10 is prompted to connect to a predetermined base station 30 of which a received radio wave intensity at a position on the path in front of the shielding object is affected by the shielding object. It should be noted that the shielding object is a radio wave shielding object which the autonomous mobile robot 10 can pass through. For example, the shielding object may be equipment including a door such as an elevator door or an automatic door.

Figure 4:
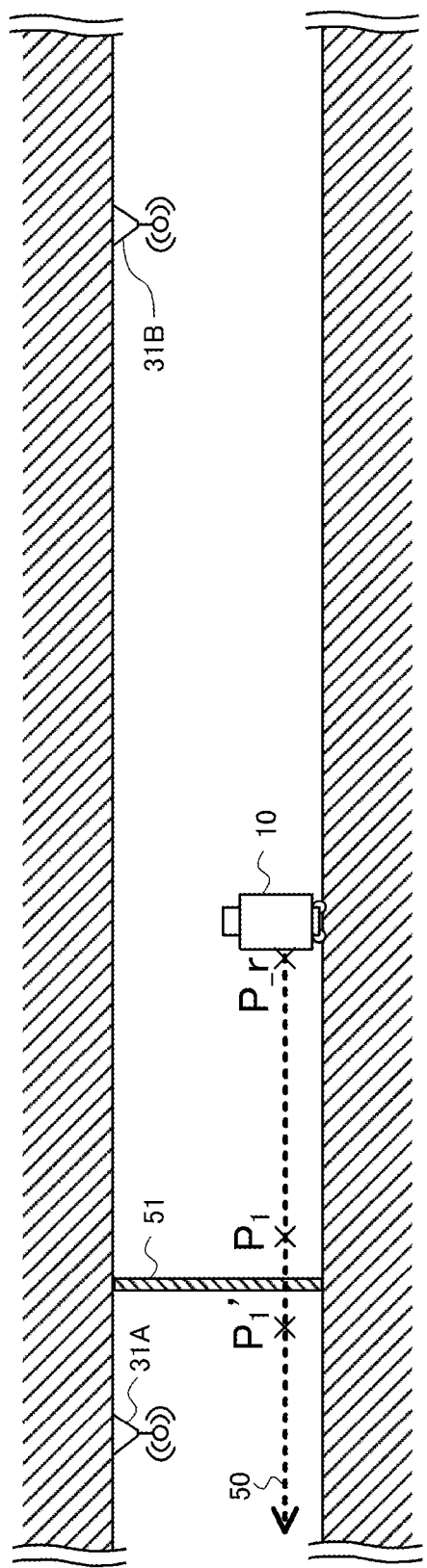
FIG. 4 is a schematic diagram showing an example of a moving environment of the autonomous mobile robot moving in a building.

A specific example of the above-described control performed by the connection control unit 160 is described with reference to the drawings. FIG. 4 is a schematic diagram showing a moving environment of the autonomous mobile robot 10 moving in a building. In the moving environment shown in FIG. 4, a path 50 along which the autonomous mobile robot 10 is to move is indicated by a broken-line arrow. In the middle of the path 50, there is a door 51 which is the above-described shielding object. More specifically, the door 51 is located between points $P_1$ and $P_1'$ on the path 50. Note that the point $P_1$ is a point immediately before the door 51 when viewed from the autonomous mobile robot 10, and the point $P_1'$ is a point immediately after the door 51 when viewed from the autonomous mobile robot 10. For example, the door 51 is closed, and when the autonomous mobile robot 10 passes through it, it is opened. Note that this opening and closing operation may be performed by the control of the server 20 as described above, by a manipulator (not shown) controlled by the control device 100 of the autonomous mobile robot 10, or by a person near the door 51.

Further, in the above moving environment, an access point 31A and an access point 31B, each of which is a specific example of the base station 30, are provided. The access point 31A is located behind the door 51 when viewed from the autonomous mobile robot 10. The access point 31B is located in front of the door 51 as viewed from the autonomous mobile robot 10. Note that radio waves are shielded against due to the influence of the closed door 51, so that at the point $P_1$ beyond the door 51, the received radio wave intensity of the radio wave from the access point 31A is lower than that at the point $P_1'$. That is, the door 51 weakens the radio waves of the access point 31A. Thus, for the autonomous mobile robot 10 at a point P_r, the received radio wave intensity of the radio wave from the access point 31B is larger than that of the radio wave from the access point 31A. Therefore, when the autonomous mobile robot 10 at the point P_r establishes a connection with either one of the access points, it generally connects with the access point 31B. In this case, when the autonomous mobile robot 10 moves along the path, it becomes difficult to communicate with the access point 31B soon, and thus it is necessary to switch the connection destination to the access point 31A.

However, in this embodiment, as described above, in a connection of communication by the radio communication unit 104, the connection control unit 160 performs control, when a shielding object is on a path along which the autonomous mobile robot 10 is to move, so that the autonomous mobile robot 10 is prompted to connect to the predetermined base station 30 of which a received radio wave intensity at a position on the path in front of the shielding object is affected by the shielding object. It should be noted that the door 51 is a radio wave shielding object located on the path 50 along which the autonomous mobile robot 10 is to move. Further, the access point 31A is an access point of which the received radio wave intensity at a position on the path 50 in front of the shielding object (the door 51) is affected by the shielding object (the door 51). That is, the access point 31A corresponds to the aforementioned predetermined base station 30. Therefore, in this embodiment, the autonomous mobile robot 10 at the point P_r performs connection processing so that it preferentially connects to the access point 31A. When the autonomous mobile robot 10 connects to the access point 31A instead of connecting to the access point 31B, a switching of the connection destination from the access point 31B to the access point 31A is not performed as described above. A temporary disconnection of communication occurs in the switching of the connection destination, and therefore it is desirable to prevent unnecessary switching. In this embodiment, it is possible to prevent such unnecessary switching.

Figure 5:
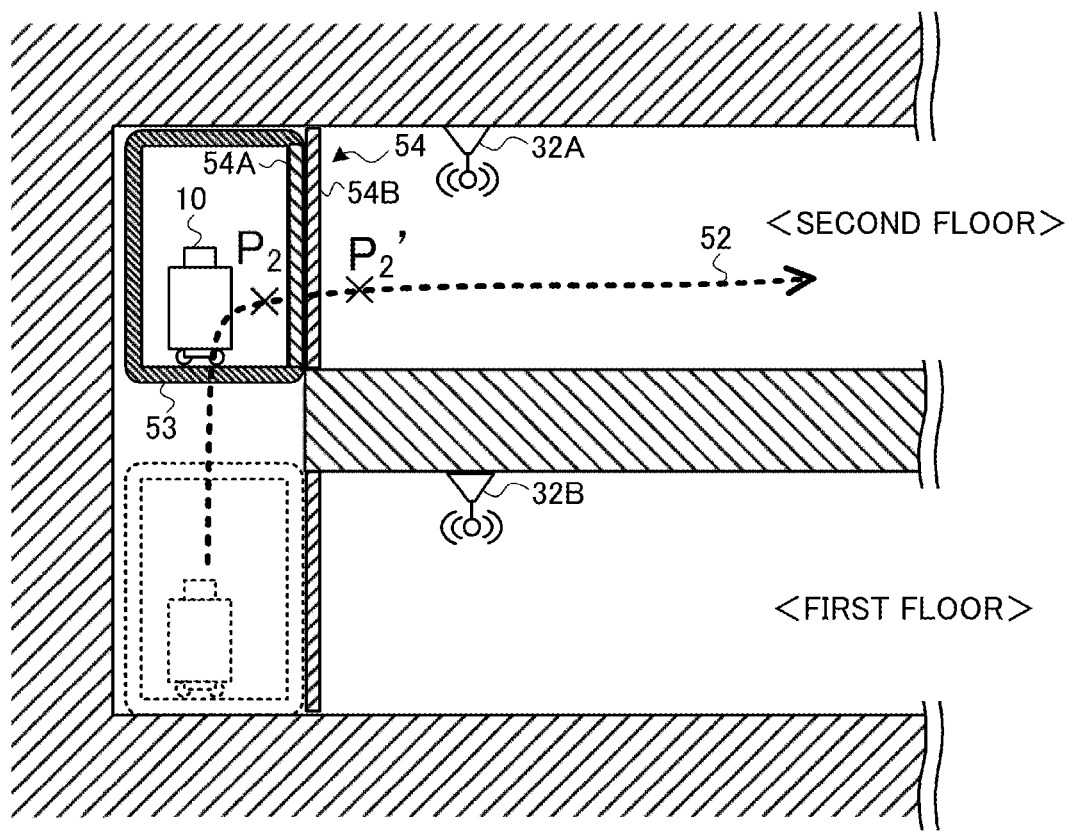
FIG. 5 is a schematic diagram showing another example of a moving environment of the autonomous mobile robot moving in a building.

Another specific example is described with reference to FIG. 5. FIG. 5 is a schematic diagram showing another moving environment of the autonomous mobile robot 10 moving in a building. In the moving environment shown in FIG. 5, a path 52 along which the autonomous mobile robot 10 is to move is indicated by a broken-line arrow. The path 52 is a path in which the autonomous mobile robot 10 moves from a first floor to a second floor of the building by getting on an elevator car 53 and further moves on the second floor. Note that FIG. 5 shows a state in which the car 53 has been moved from the first floor to the second floor.

As shown in FIG. 5, in the middle of the path 52, there is an elevator door 54 which is the above-described shielding object. The elevator door 54 is a door that is opened and closed when the autonomous mobile robot 10 or the like gets on and off the car. In the example shown in FIG. 5, the elevator door 54 comprises a door 54A of the car 53 and a door 54B provided between a moving space of the car 53 and a space of the second floor. When the car 53 arrives at the second floor, the doors 54A and 54B are opened in synchronization with each other. Further, when the car 53 is moved from the second floor, the doors 54A and 54B are closed in synchronization with each other. The movement of the car 53 and the opening and closing of the elevator door 54 may be controlled by the server 20. In the example shown in FIG. 5, the elevator door 54 is located between a point $P_2$ and a point $P_2'$ on the path 52. Note that the point $P_2$ is a point immediately before the elevator door 54 when viewed from the autonomous mobile robot 10, and the point $P_2'$ is a point immediately after the elevator door 54 when viewed from the autonomous mobile robot 10.

Further, in the above moving environment, an access point 32A and an access point 32B, each of which is a specific example of the base station 30, are provided. The access point 32A is located behind the elevator door 54 when viewed from the autonomous mobile robot 10. The access point 32B is located in front of the elevator door 54 as viewed from the autonomous mobile robot 10. Note that radio waves are shielded against due to the influence of the closed elevator door 54, so that at the point $P_2$ beyond the elevator door 54, the received radio wave intensity of the radio wave from the access point 32A is lower than that at the point $P_2'$. That is, the elevator door 54 weakens the radio waves of the access point 32A.

For example, it is assumed here that the autonomous mobile robot 10 establishes a connection with the access point 32B at the time when the autonomous mobile robot 10 is on the first floor. In this case, the radio waves of the access point 32A in the car 53 are too weak. Thus, by the conventional technique, the connection destination may not be switched to the access point 32A until the car 53 arrives at the second floor and the elevator door 54 is opened. That is, until the car 53 arrives at the second floor and the elevator door 54 is opened, the connection to the access point 32B may be continued. As the access point 32B is an access point on the first floor, sufficient radio waves do not reach the autonomous mobile robot 10 which has arrived at the second floor. Therefore, for example, even if the autonomous mobile robot 10 needs to perform communication, such as reporting on the progress of tasks, with the server 20 immediately after getting off the car 53 on the second floor, the autonomous mobile robot 10 connected to the access point 32B cannot perform the communication. Further, even if the connection destination is switched to the access point 32A at that time, the actual start of communication is delayed by the time required for the switching.

However, in this embodiment, as described above, in a connection of communication performed by the radio communication unit 104, the connection control unit 160 performs control, when a shielding object is on a path along which the autonomous mobile robot 10 is to move, so that the autonomous mobile robot 10 is prompted to connect to the predetermined base station 30 of which a received radio wave intensity at a position on the path in front of the shielding object is affected by the shielding object. It should be noted that the elevator door 54 is a radio wave shielding object located on the path 52 along which the autonomous mobile robot 10 is to move. Further, the access point 32A is an access point of which the received radio wave intensity at a position on the path 52 in front of the shielding object (the elevator door 54) is affected by the shielding object (the elevator door 54). That is, the access point 32A corresponds to the predetermined base station 30. Therefore, in this embodiment, the autonomous mobile robot 10 in the car 53 performs connection processing so that it preferentially connects to the access point 32A. Thus, it is possible to establish a connection with the access point 32A before the autonomous mobile robot 10 gets off the car 53 on the second floor. Accordingly, for example, it is possible for the autonomous mobile robot 10 to communicate with the server 20 immediately after it gets off the car 53. In this embodiment, as described above, communication can be enabled at a desired timing.

The connection control unit 160 performs the above-described control, for example, as follows. FIG. 6 is a table showing an example of a predetermined rule used for the control performed by the connection control unit 160. This rule is stored in advance, for example, in a storage device such as the memory 111. The table in FIG. 6 explicitly shows, for each shielding object, an access point (a base station) to which the autonomous mobile robot 10 is to be prompted to connect. The access point to which the autonomous mobile robot 10 is to be prompted to connect shown in the table corresponds to the predetermined base station 30 described above. That is, the access point which is indicated in the rule and to which the autonomous mobile robot 10 is to be prompted to connect is the base station 30 of which the received radio wave intensity at a position on the path in front of a shielding object is affected by the shielding object. This predetermined base station 30 (i.e., the access point to which the autonomous mobile robot 10 is to be prompted to connect) is specified in advance, for example, by examining the moving environment and the radio environment at each point in advance. That is, rules as shown in FIG. 6 are defined in advance by examining in advance the base station 30 of which the received radio wave intensity is affected by the shielding object for each assumed shielding object on the path. Note that these rules may be referred to as connection prompting rules.

For example, the rule indicated by a rule number one is a rule indicating that when the point immediately before the shielding object is $P_1$ and the position immediately after the shielding object is $P_1'$ as viewed from the autonomous mobile robot 10, the access point having identification information (e.g., a Service Set Identifier (SSID)) $AP_3$ is the access point to which the autonomous mobile robot 10 is to be prompted to connect. Note that not only a path in the direction from the point $P_1$ to the point $P_1'$ but also a path in the opposite direction (a path in the direction from the point $P_1'$ to $P_1$) may exist with respect to the shielding object. This fact is defined in the rule indicated by a rule number two. Similarly, the rule indicated by a rule number three is a rule indicating that when the point immediately before the shielding object is $P_2$ and the position immediately after the shielding object is $P_2'$ as viewed from the autonomous mobile robot 10, the access point having identification information $AP_4$ is the access point to which the autonomous mobile robot 10 is to be prompted to connect. Note that not only a path in the direction from the point $P_2$ to the point $P_2'$ but also a path in the opposite direction (a path in the direction from the point $P_2'$ to $P_2$) may exist with respect to the shielding object. This fact is defined in the rule indicated by a rule number four. It can be considered that the position immediately before the shielding object and the position immediately after the shielding object in the connection prompting rules shown in FIG. 6 represent the position of the shielding object and the direction of the path. Therefore, it can also be considered that the table shown in FIG. 6 defines, for each position of the shielding object and each direction of the path, the access point to which the autonomous mobile robot 10 is to be prompted to connect.

Note that in the example shown in FIG. 4, the access point corresponding to the $AP_3$ described above is the access point 31A. Similarly, in the example shown in FIG. 5, the access point corresponding to the $AP_4$ described above is the access point 32A.

The connection control unit 160 refers to the connection prompting rule and thereby performs control so that the autonomous mobile robot 10 is prompted to connect to the base station which is indicated in the rule and to which the autonomous mobile robot 10 is to be prompted to connect. For example, when the moving path planned by the path planning unit 140 is a path passing through the points $P_1$ and $P_1'$ in this order and the self-position of the autonomous mobile robot 10 estimated by the position estimation unit 130 is before the point $P_1$, the connection control unit 160 performs control so that the autonomous mobile robot 10 is prompted to connect to the access point identified by $AP_3$ in accordance with the rule indicated by the rule number one. Note that the control operation performed by the connection control unit 160 will be described later with reference to a flowchart.

A specific example of control for prompting a connection is described below. As an example of the control for prompting a connection, the connection control unit 160 may perform control so that the autonomous mobile robot 10 connects to the predetermined base station 30 to which the autonomous mobile robot 10 is to be prompted to connect. That is, when a connection destination is to be determined, priority may be given to the connection to the predetermined base station 30. By doing so, the autonomous mobile robot 10 preferentially connects to the predetermined base station 30. Therefore, even when there is a shielding object, it is possible to reliably select the predetermined base station 30 as a connection destination.

Further, as another example of the control for prompting a connection, the connection control unit 160 may compare a value obtained by correcting and increasing a value of a received radio wave intensity of a radio wave from the predetermined base station 30 which is a base station to which the autonomous mobile robot 10 is to be prompted to connect with a value of a received radio wave intensity of a radio wave from another base station 30 and thereby determine the base station 30 to which the autonomous mobile robot 10 connects. As described above, when the autonomous mobile robot 10 is in front of the shielding object on the path, the received radio wave intensity of the radio wave from the access point to which the autonomous mobile robot 10 is to be prompted to connect is reduced due to the influence of the shielding object. Thus, if the received radio wave intensity of the radio wave from the predetermined base station 30 is left as it is, the received radio wave intensity of the radio wave from the predetermined base station 30 may be smaller than that of the radio waves from the other base station 30. Accordingly, when the base station 30 is selected based on the magnitude of the received radio wave intensity, the predetermined base station 30 is not selected. Therefore, the connection control unit 160 makes a correction by adding a predetermined value to the actual received radio wave intensity of the radio wave from the predetermined base station 30. Then, for example, the connection control unit 160 may compare the corrected and increased value with a value of the actual received radio wave intensity of the radio wave from the other base station 30 and thereby select the base station 30 having a higher received radio wave intensity. In this way, in regard to the predetermined base station 30, the increased received radio wave intensity is used for the above comparison. Thus, it is possible to prevent occurrence of a case in which the predetermined base station 30 is not selected due to a decrease in the received radio wave intensity caused by the influence of the shielding object. Therefore, it is possible to select the base station 30 of which radio waves are interfered with by the shielding object as a connection destination.

Next, the server 20 is described in detail.

Figure 7:
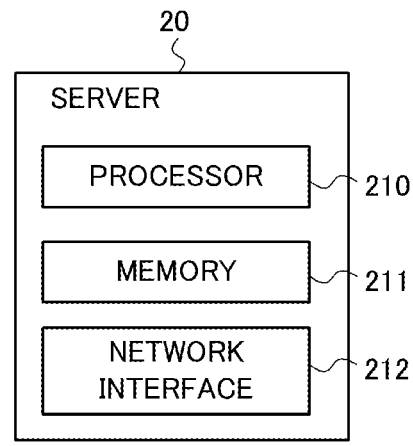
FIG. 7 is a block diagram showing an example of a hardware configuration of a server according to the embodiment.

FIG. 7 is a block diagram showing an example of a hardware configuration of the server 20. As shown in FIG. 7, the server 20 includes a network interface 212, a memory 211, and a processor 210. The network interface 212, the memory 211, and the processor 210 are connected to one another via a data bus or the like.

The network interface 212 is used to communicate with any other device. For example, the network interface 212 may be used to communicate with other equipment, such as an elevator, an automatic door, or the like located in the moving environment. Further, the network interface 212 may be used to communicate with the autonomous mobile robot 10 via the base station 30. The Network interface 212 may include, for example, a network interface card (NIC).

The memory 211 is composed of, for example, a combination of a volatile memory and a non-volatile memory. The memory 211 is used to store software (a computer program) including at least one instruction executed by the processor 210, and data used for various processing of the server 20.

The processor 210 loads the software (the computer program) from the memory 211 and executes the loaded software, thereby performing, for example, processing of each of a task management unit 220 and an environment control unit 230 shown in FIG. 8 which will be described later.

The processor 210 may be, for example, a microprocessor, an MPU, or a CPU. The processor 210 may include a plurality of processors.

As described above, the server 20 has a function as a computer.

Note that the above-described program performed by the autonomous mobile robot 10 or the server 20 can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Figure 8:
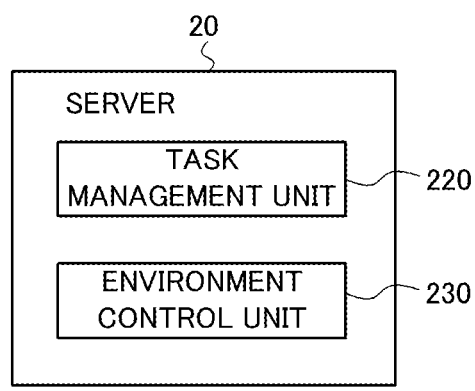
FIG. 8 is a block diagram showing an example of a functional configuration of the server according to the first embodiment.

FIG. 8 is a block diagram showing an example of a functional configuration of the server 20. As shown in FIG. 8, the server 20 includes the task management unit 220 and the environment control unit 230.

The task management unit 220 provides a task to be executed by the autonomous mobile robot 10 to the autonomous mobile robot 10. That is, the task management unit 220 transmits a series of tasks for achieving a predetermined purpose to the autonomous mobile robot 10. Further, the task management unit 220 manages the progress of the tasks reported by the autonomous mobile robot 10.

The environment control unit 230 controls equipment used for the autonomous mobile robot 10 to execute the tasks. Specifically, the environment control unit 230 controls the equipment located in the moving environment in accordance with the progress made in the tasks of the autonomous mobile robot 10. That is, the environment control unit 230 controls the equipment upon receiving, from the autonomous mobile robot 10, the progress report indicating, for example, that the autonomous mobile robot 10 has arrived at the elevator hall. For example, the environment control unit 230 controls the elevator car so that it moves to the floor on which the autonomous mobile robot 10 is waiting when the autonomous mobile robot 10 arrives at the elevator hall, or controls the elevator car so that it moves to the floor to which the autonomous mobile robot 10 should go when the autonomous mobile robot 10 gets on the elevator car. Note that the environment control unit 230 implements these controls by communicating with the equipment located in the moving environment.

Figure 9:
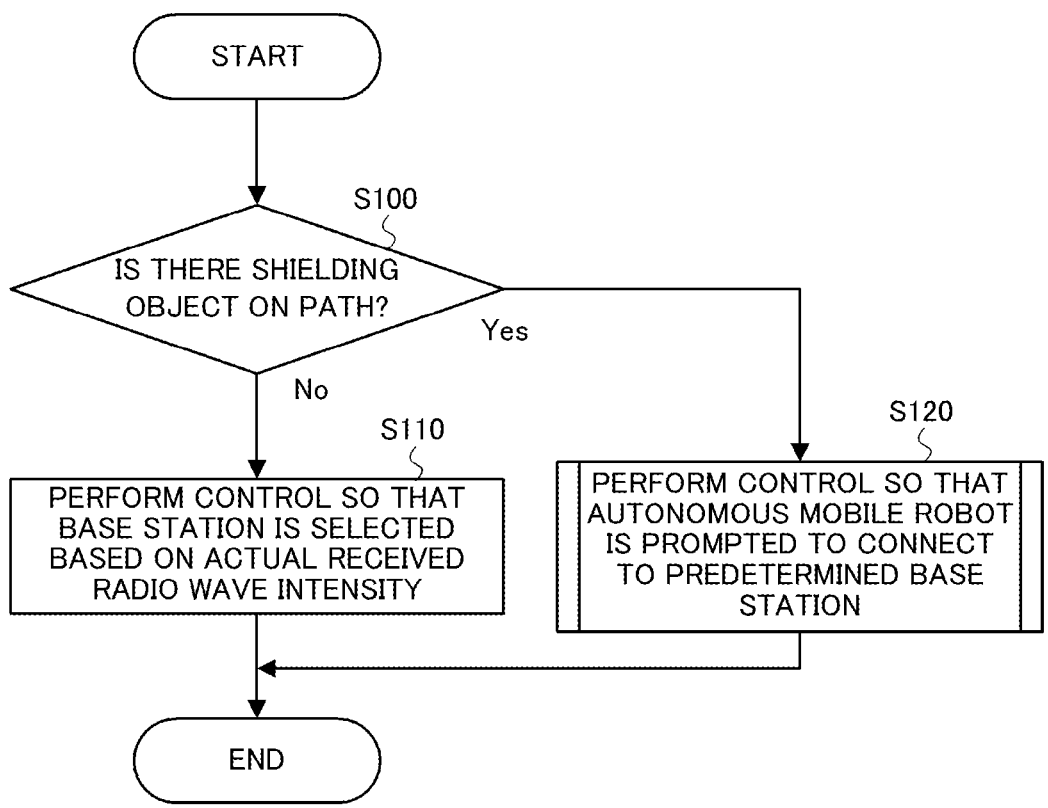
FIG. 9 is a flowchart showing a control method for controlling a connection between the autonomous mobile robot and a base station.

Next, the connection control described above is further described with reference to a flowchart. FIG. 9 is a flowchart showing a control method for controlling a connection between the autonomous mobile robot 10 and the base station 30 in this embodiment.

In Step S100, the connection control unit 160 determines whether there is a radio wave shielding object on the path along which the autonomous mobile robot 10 is to move. For example, the connection control unit 160 refers to a map showing the position of the shielding object and determines whether there is the shielding object on the planned path. Note that the connection control unit 160 may determine whether there is a shielding object on the path along which the autonomous mobile robot 10 is to move based on whether a connection prompting rule including the point on the planned path exists. When there is no shielding object on the path along which the autonomous mobile robot 10 is to move, the connection control shown in Step S110 is performed, while when there is a shielding object on the path along which the autonomous mobile robot 10 is to move, the connection control shown in Step S120 is performed.

In Step S110, the connection control unit 160 performs control so that the base station 30 is selected based on the actual received radio wave intensity. That is, the base station 30 is selected without the above-described prompting control being performed.

Meanwhile, in Step S120, as described above, in a connection of communication performed by the radio communication unit 104, the connection control unit 160 performs control so that the autonomous mobile robot 10 is prompted to connect to the predetermined base station 30 of which the received radio wave intensity at a position on the path in front of the shielding object is affected by this shielding object. This prompting control will be described in more detail with reference to FIG. 10.

Figure 10:
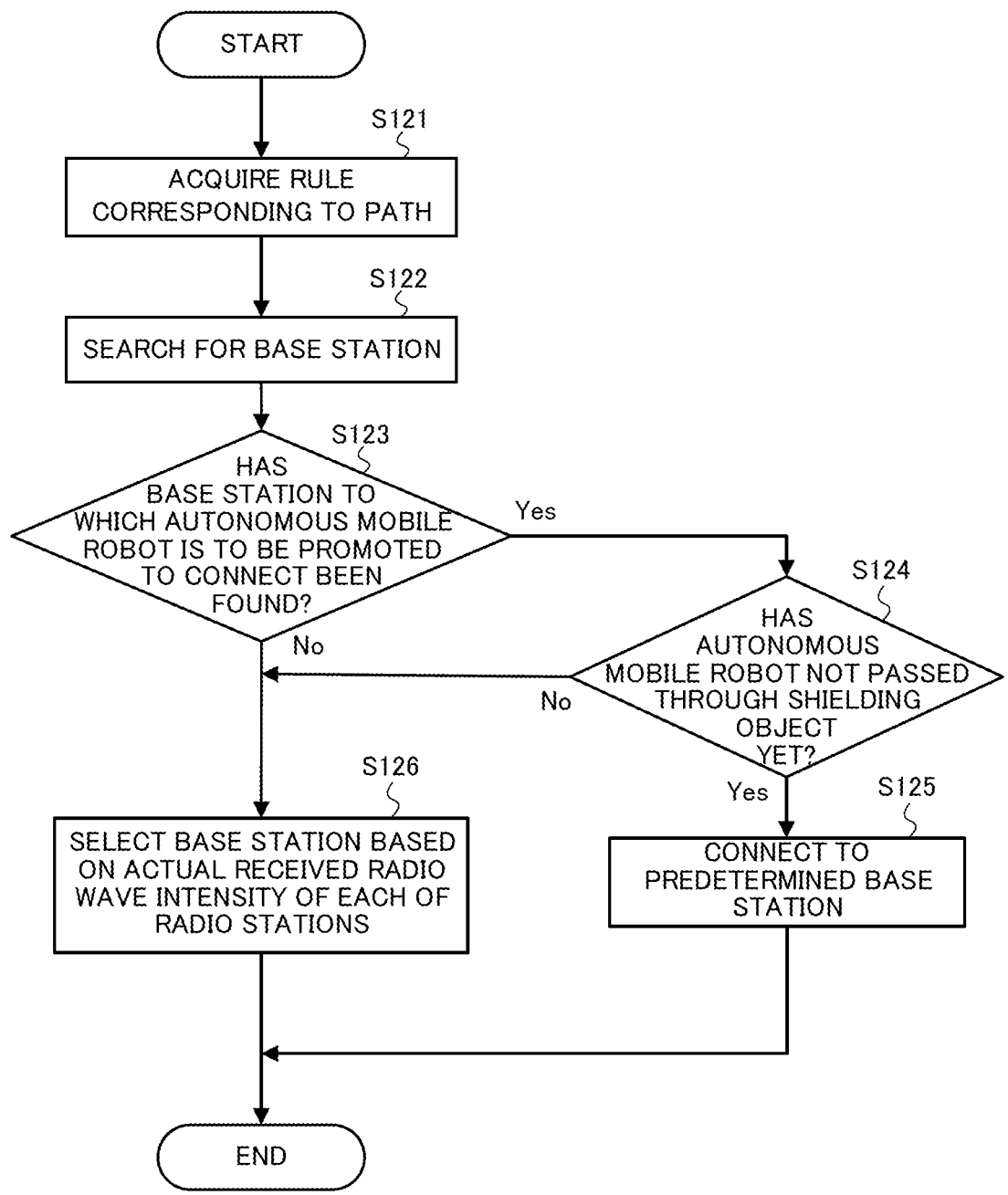
FIG. 10 is a flowchart showing an example of a flow of processing of a prompting control.

FIG. 10 is a flowchart showing an example of a flow of processing of the prompting control in this embodiment. An example of the flow of the prompting control is described below with reference to FIG. 10.

In Step S121, the connection control unit 160 acquires the connection prompting rule corresponding to the planned path. That is, the connection control unit 160 extracts the connection prompting rule including the point on the planned path from among the rules stored in advance.

Next, in Step S122, the connection control unit 160 searches for the base stations 30.

Next, in Step S123, the connection control unit 160 determines whether the base station 30 (i.e., the predetermined base station) which is indicated in the connection prompting rule acquired in Step S121 and to which the autonomous mobile robot 10 is to be prompted to connect has been found. If no base station 30 to which the autonomous mobile robot 10 is to be prompted to connect has been found, the process proceeds to Step S126. On the other hand, if the base station 30 to which the autonomous mobile robot 10 is to be prompted to connect has been found, the process proceeds to Step S124.

In Step S124, the connection control unit 160 determines whether the autonomous mobile robot 10 has not yet passed through the shielding object. That is, the connection control unit 160 determines whether the current position of the autonomous mobile robot 10 is a position before it passes through the shielding object corresponding to the connection prompting rule for the found base station 30 to which the autonomous mobile robot 10 is to be prompted to connect. If the autonomous mobile robot 10 has not yet passed through the shielding object, the process proceeds to Step S125. If the autonomous mobile robot 10 has already passed through the shielding object, the received radio wave intensity of the base station 30 to which the autonomous mobile robot 10 is to be prompted to connect is no longer affected by the shielding object. Therefore, the process proceeds to Step S126.

In Step S125, the connection control unit 160 performs control so that the autonomous mobile robot 10 connects to the found base station 30 to which the autonomous mobile robot 10 is to be prompted to connect. Note that as described above, the connection control unit 160 may compare a value obtained by correcting and increasing the value of the actual received radio wave intensity of the radio wave from this found base station 30 with the value of the actual received radio wave intensity of the radio wave from another base station 30 found and thereby select the base station 30 having a higher received radio wave intensity.

Meanwhile, in Step S126, the connection control unit 160 performs control so that the base station 30 is selected based on the actual received radio wave intensity of each of the found base stations 30. For example, the connection control unit 160 selects the base station 30 having the maximum received radio wave intensity as the base station 30 to which the autonomous mobile robot 10 connects.

Note that in the flowchart shown in FIG. 10, the connection control unit 160 performs control so that the autonomous mobile robot 10 connects to the found base station 30 to which the autonomous mobile robot 10 is to be prompted to connect if the autonomous mobile robot 10 has not yet passed through the shielding object, but the following modified example can also be considered. In the modified example, when it is determined in Step S124 that the autonomous mobile robot 10 has not yet passed through the shielding object, the connection control unit 160 performs the following processing. That is, the connection control unit 160 determines whether the section from the current location of the autonomous mobile robot 10 to the shielding object is a section in which no communication is performed. This processing may be performed, for example, by determining whether the section from the current location of the autonomous mobile robot 10 to the shielding object corresponds to the sections shown in a list of sections in which no communication is performed, the list being stored in advance in a storage device such as the memory 111. If the section from the current location of the autonomous mobile robot 10 to the shielding object is the section in which no communication is performed, the process proceeds to Step S125, while if the section from the current location of the autonomous mobile robot 10 to the shielding object is not the section in which no communication is performed, the process proceeds to Step S126. In the connection processing in Step S125, since the autonomous mobile robot 10 is prompted to connect to the predetermined base station 30, the autonomous mobile robot 10 may connect to the predetermined base station 30 to which the autonomous mobile robot 10 is to be prompted to connect in a state where the received radio wave intensity is insufficient. However, by doing the above, the connection processing in Step S125 is performed only in the section in which no communication is performed. Therefore, even when the autonomous mobile robot 10 connects to the base station 30 to which the autonomous mobile robot 10 is to be prompted to connect in a state where the received radio wave intensity is insufficient, it is possible to prevent failures due to a communication malfunction. As described above, when the position of the autonomous mobile robot 10 is a position on the path in front of the shielding object, and the section in which the autonomous mobile robot 10 moves from the position to the shielding object is a section in which no communication is performed, the connection control unit 160 may perform control so that the autonomous mobile robot 10 is prompted to connect to a predetermined base station.

The first embodiment has been described above. According to this embodiment, when there is a shielding object, the autonomous mobile robot is prompted to connect to a predetermined base station of which the received radio wave intensity is affected by the shielding object. Therefore, even when there is a shielding object, it is possible to select the base station of which radio waves are interfered with by the shielding object as a connection destination.

Note that although an example in which the autonomous mobile robot 10 performs processing related to a connection has been described in the above embodiment, the server 20 may instead perform at least some of the processing. Further, in this case, for example, the task management unit 220 of the server 20 provides a task of moving from a first point to a second point to the autonomous mobile robot 10, and at the same time it may notify the autonomous mobile robot 10 about the base station 30 to which the autonomous mobile robot 10 should be prompted to connect during the execution of the task.

Second Embodiment

Figure 11:
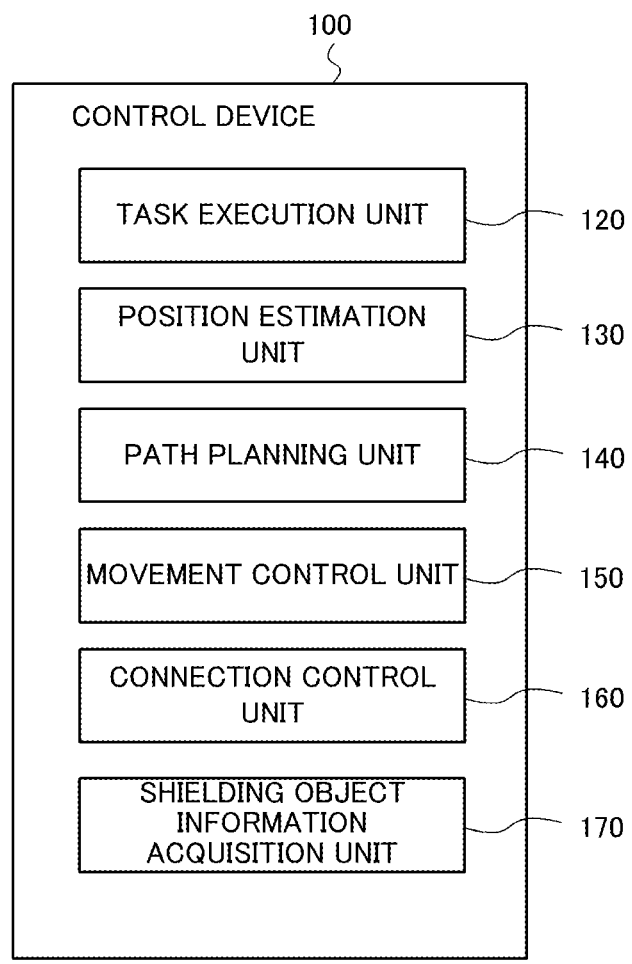
FIG. 11 is a block diagram showing an example of a functional configuration of a control device of an autonomous mobile robot according to a second embodiment.

Next, a second embodiment is described. In this embodiment, connection control is appropriately performed even when a shielding object newly appears in the moving environment. FIG. 11 is a block diagram showing an example of a functional configuration of a control device 100 of the autonomous mobile robot 10 according to the second embodiment. As shown in FIG. 11, the autonomous mobile robot 10 according to the second embodiment differs from the autonomous mobile robot 10 according to the first embodiment in that the autonomous mobile robot 10 according to the second embodiment further includes a shielding object information acquisition unit 170.

The shielding object information acquisition unit 170 acquires position information of a shielding object detected by the autonomous mobile robot 10. Specifically, the shielding object information acquisition unit 170 acquires the position of the shielding object which has newly appeared in the moving environment based on information acquired by the environment sensor 101 and the self-position of the autonomous mobile robot 10 estimated by the position estimation unit 130. For example, when an object which has a predetermined size or larger and is not located on the map of the moving environment stored in advance but located on the path is detected, the shielding object information acquisition unit 170 determines this object to be a new shielding object. Such a shielding object may be, for example, an object temporarily placed on the path, a group of people present on the path, or a group of robots not including the autonomous mobile robot 10 located on the path.

Further, the connection control unit 160 according to this embodiment specifies, based on a position of the shielding object indicated by the position information that is acquired by the shielding object information acquisition unit 170 and a predetermined rule indicating the base station to which the autonomous mobile robot 10 should be prompted to connect when the shielding object is at the position, the predetermined base station to which the autonomous mobile robot 10 is to be prompted to connect. This predetermined rule is described below.

FIG. 12 is a table showing an example of the predetermined rule used for control performed by the connection control unit 160 according to this embodiment. The table shown in FIG. 12 differs from the table shown in FIG. 6 in that the table shown in FIG. 12 contains flag information indicating the presence or absence of the shielding object for each rule. In the table shown in FIG. 6, rules are defined for each shielding object actually located. Meanwhile, in the table shown in FIG. 12, rules are defined on the assumption that shielding objects are actually located. In this embodiment, rules are used in which for various points in the moving environment, access points to which autonomous mobile robot 10 is to be prompted to connect when shielding objects appear at the points are defined in advance. As described above, each of the rules is accompanied by flag information indicating whether a shielding object is actually located. Further, when the flag information indicates that the shielding object is located, the rule corresponding to this flag information becomes valid. On the other hand, when the flag information indicates that no shielding object is located, the rule corresponding to this flag information becomes invalid. That is, the flag information can also be referred to as information indicating the validity of a rule. The connection control unit 160 performs connection control based on a rule of which the state is set to be valid among the rules. In the example of the table shown in FIG. 12, there is a shielding object at a point between the point $P_2$ and the point $P_2'$, and accordingly, the rules of rule numbers three and four are valid. Meanwhile, in the example of the table shown in FIG. 12, since there are no shielding objects at a point between the point $P_1$ and the point $P_1'$, and at a point between a point $P_3$ and a point $P_3'$, the rules of rule numbers one, two, five, and six are invalid. Therefore, these rules are ignored in connection control. Note that in the definitions of the rules, the access points to which autonomous mobile robot 10 is to be prompted to connect may be defined in advance on the assumption that shielding objects appear at all points on the path in the moving environment, or may instead be defined on the assumption that shielding objects appear only at main points.

When the shielding object information acquisition unit 170 newly acquires position information of the shielding object, the connection control unit 160 updates the flag information of the rule corresponding to the position indicated by the position information. Then, the connection control unit 160 performs connection control similar to that of the first embodiment by using a valid rule among the rules.

The second embodiment has been described above. According to this embodiment, the predetermined base station which corresponds to the shielding object detected by the autonomous mobile robot 10 and to which the autonomous mobile robot 10 should be prompted to connect is specified. Therefore, even when a shielding object newly appears, it is possible to select the base station of which radio waves are interfered with by this shielding object as a connection destination.

Note that although an example in which the autonomous mobile robot 10 performs processing related to a connection has been described in this embodiment, the server 20 may instead perform at least some of the processing. For example, the server 20 may acquire position information of the shielding object detected by the autonomous mobile robot 10 and manage the validity of each rule based on the acquired information.

Third Embodiment

Figure 13:
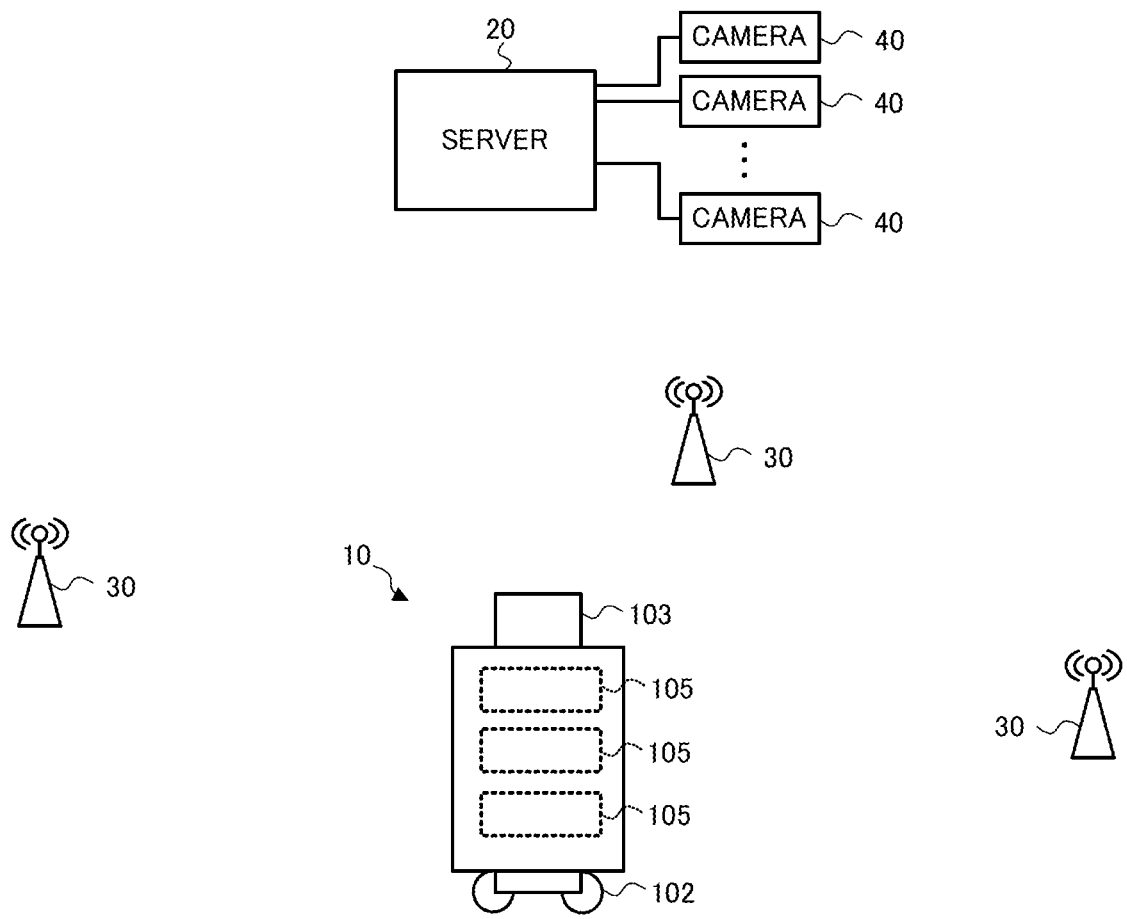
FIG. 13 is a schematic diagram showing an example of a system configuration of a task execution system according to a third embodiment.

Next, a third embodiment is described. In the second embodiment, the shielding object located in the moving environment is detected by the autonomous mobile robot 10. Meanwhile, in this embodiment, the shielding object is detected based on an image shot by a camera installed in the moving environment. FIG. 13 is a schematic diagram showing an example of a system configuration of a task execution system 2 according to the third embodiment. In this embodiment, the task execution system 2 differs from the above-described task execution system 1 in that the task execution system 2 further includes one or more cameras 40. The camera 40 shoots a path in the moving environment. That is, the camera 40 shoots a moving path of the autonomous mobile robot 10. The camera 40 may be a monitoring camera installed on a wall, a ceiling, or the like of the path in order to monitor the moving environment. The camera 40 and the server 20 are connected to each other wirelessly or by wire so that they can communicate with each other, and the image shot by the camera 40 is transmitted to the server 20.

Figure 14:
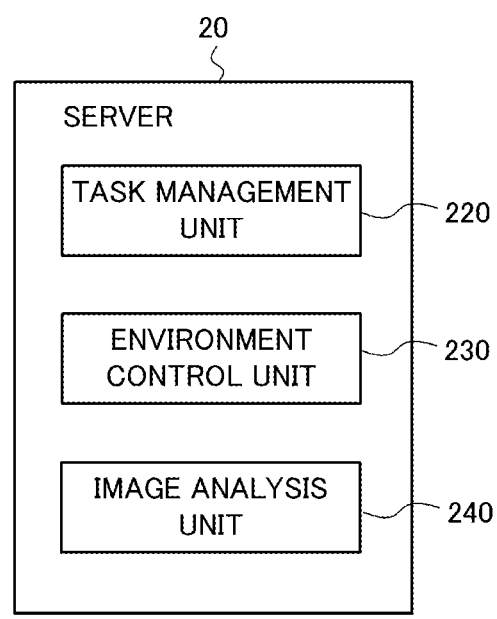
FIG. 14 is a block diagram showing an example of a functional configuration of a server according to the third embodiment.

FIG. 14 is a block diagram showing an example of a functional configuration of the server 20 according to the third embodiment. As shown in FIG. 14, the server 20 differs from those of the above-described embodiments in that it further includes an image analysis unit 240.

The image analysis unit 240 analyzes the position of the shielding object based on the image of the camera 40. Each camera 40 shoots a predetermined range in the moving environment. Therefore, the position of the object shown in the image of each camera 40 in the moving environment can be specified from the image. The image analysis unit 240 detects a shielding object that has newly appeared in the moving environment by performing known image recognition processing, and acquires the position of the shielding object in the moving environment. For example, when an object having a predetermined size or larger appears on the path, the image analysis unit 240 detects this object as a new shielding object. Such a shielding object may be, for example, an object temporarily placed on the path, a group of people present on the path, or a group of robots not including the autonomous mobile robot 10 located on the path.

The image analysis unit 240 transmits the position of the detected shielding object to the autonomous mobile robot 10. The connection control unit 160 according to this embodiment performs connection control similar to that of the second embodiment, for example, by using the rules shown in FIG. 12. That is, the connection control unit 160 specifies, based on the position obtained by the analysis performed by the image analysis unit 240 and the predetermined rule indicating the base station to which the autonomous mobile robot 10 should be prompted to connect when the shielding object is at the position, the predetermined base station to which the autonomous mobile robot 10 is to be prompted to connect. Like in the case of the second embodiment, the connection control unit 160 of the autonomous mobile robot 10 updates the flag information of the rule corresponding to the position of the shielding object which the server 20 has sent a notification about. Then, the connection control unit 160 performs connection control similar to that of the first embodiment by using a valid rule among the rules.

The third embodiment has been described above. According to this embodiment, the predetermined base station which corresponds to the shielding object shot by the camera 40 and to which the autonomous mobile robot 10 should be prompted to connect is specified. Therefore, even when a shielding object newly appears, it is possible to select the base station of which radio waves are interfered with by this shielding object as a connection destination. Note that the second and the third embodiments may be combined. That is, both the detection of the shielding object by the autonomous mobile robot 10 and the detection of the shielding object by means of the image of the camera 40 may be performed.

Note that although an example in which the server 20 performs processing for acquiring a position of the shielding object from the image of the camera 40 has been described in this embodiment, the autonomous mobile robot 10 may instead perform at least some of the processing.

Note that the present disclosure is not limited to the above-described embodiments and may be modified as appropriate without departing from the spirit of the present disclosure. For example, in the above-described embodiments, the processing of each of the position estimation unit 130, the path planning unit 140, the movement control unit 150, and the connection control unit 160 is performed by the autonomous mobile robot 10, but some or all of the processing may be performed by the server 20 or other devices.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A control system configured to control a connection between an autonomous mobile robot and a base station, the control system comprising:
a circuit configured to communicate with the base station;
a processor configured to, in a connection of communication performed by the circuit, perform control, when a radio wave shielding object which the autonomous mobile robot is able to pass through is on a path along which the autonomous mobile robot is to move, so that the autonomous mobile robot is prompted to connect to a predetermined base station of which a received radio wave intensity at a position on the path in front of the shielding object is affected by the shielding object; and
the processor configured to acquire position information of the shielding object detected by the autonomous mobile robot,
wherein the processor specifies, based on a position of the shielding object indicated by the position information that is acquired by the processor and a predetermined rule indicating a base station to which the autonomous mobile robot should be prompted to connect when the shielding object is at the position, the predetermined base station to which the autonomous mobile robot is to be prompted to connect.

2. The control system according to claim 1, wherein the processor performs control so that the autonomous mobile robot connects to the predetermined base station.

3. The control system according to claim 1, wherein the processor compares a value obtained by correcting and increasing a value of a received radio wave intensity of a radio wave from the predetermined base station with a value of a received radio wave intensity of a radio wave from another base station and thereby determines a base station to be a connection destination.

4. The control system according to claim 1, further comprising a server configured to analyze the position of the shielding object based on an image of a camera configured to shoot the path,
wherein the processor specifies, based on the position obtained by the analysis performed by the server and the predetermined rule indicating the base station to which the autonomous mobile robot should be prompted to connect when the shielding object is at the position, the predetermined base station to which the autonomous mobile robot is to be prompted to connect.

5. The control system according to claim 1, wherein when a position of the autonomous mobile robot is the position on the path in front of the shielding object and a section in which the autonomous mobile robot moves from the position to the shielding object is a section in which no communication is performed, the processor performs control so that the autonomous mobile robot is prompted to connect to the predetermined base station.

6. The control system according to claim 1, wherein the shielding object is equipment including a door.

7. The control system according to claim 1, wherein the shielding object is an object that is temporarily located on the path.

8. A control method for controlling a connection between an autonomous mobile robot and a base station, the control method comprising:
- determining whether a radio wave shielding object which the autonomous mobile robot is able to pass through is on a path along which the autonomous mobile robot is to move;
- acquiring position information of the shielding object detected by the autonomous mobile robot;
- specifying, based on a position of the shielding object indicated by the position information that is acquired and a predetermined rule indicating a base station to which the autonomous mobile robot should be prompted to connect when the shielding object is at the position, the predetermined base station to which the autonomous mobile robot is to be prompted to connect; and
- in a connection of communication performed by a circuit configured to communicate with the base station, performing control, when the shielding object is on the path, so that the autonomous mobile robot is prompted to connect to the predetermined base station of which a received radio wave intensity at a position on the path in front of the shielding object is affected by the shielding object.

9. A non-transitory computer readable medium storing a program for controlling a connection between an autonomous mobile robot and a base station, the program causing a computer to execute:
- a determination step of determining whether a radio wave shielding object which the autonomous mobile robot is able to pass through is on a path along which the autonomous mobile robot is to move;
- an acquisition step of acquiring position information of the shielding object detected by the autonomous mobile robot,
- a specification step of specifying, based on a position of the shielding object indicated by the position information that is acquired and a predetermined rule indicating a base station to which the autonomous mobile robot should be prompted to connect when the shielding object is at the position, the predetermined base station to which the autonomous mobile robot is to be prompted to connect; and
- a control step of, in a connection of communication performed by a circuit configured to communicate with the base station, performing control, when the shielding object is on the path, so that the autonomous mobile robot is prompted to connect to the predetermined base station of which a received radio wave intensity at a position on the path in front of the shielding object is affected by the shielding object.

* * * * *